(12) United States Patent
Drader et al.

(10) Patent No.: US 8,964,103 B2
(45) Date of Patent: Feb. 24, 2015

(54) METHOD AND APPARATUS FOR REDUCING CONTINUOUS AUTOFOCUS POWER CONSUMPTION

(75) Inventors: Marc Drader, Waterloo (CA); James Alexander Robinson, Elmira (CA); Michael Lorne Purdy, Kitchener (CA)

(73) Assignee: BlackBerry Limited, Waterloo (CA)

( * ) Notice: Subject to any disclaimer, the term of this patent is extended or adjusted under 35 U.S.C. 154(b) by 676 days.

(21) Appl. No.: 12/706,419

(22) Filed: Feb. 16, 2010

(65) Prior Publication Data
US 2011/0199533 A1  Aug. 18, 2011

(51) Int. Cl.
*H04N 5/232* (2006.01)
*H04N 101/00* (2006.01)

(52) U.S. Cl.
CPC ........ *H04N 5/23212* (2013.01); *H04N 2101/00* (2013.01); *H04N 5/23241* (2013.01)
USPC ............................. 348/350; 348/349; 348/372

(58) Field of Classification Search
CPC .................................................... H04N 5/2356
USPC ................................................. 348/345–350
See application file for complete search history.

(56) References Cited

U.S. PATENT DOCUMENTS

| | | | |
|---|---|---|---|
| 5,282,045 A | 1/1994 | Mimura et al. | |
| 6,031,999 A * | 2/2000 | Ogawa | 396/303 |
| 6,683,677 B2 | 1/2004 | Chon et al. | |
| 7,174,031 B2 | 2/2007 | Rhoads et al. | |
| 7,301,563 B1 | 11/2007 | Kakinuma et al. | |
| 7,312,819 B2 | 12/2007 | Ma et al. | |
| 7,379,566 B2 | 5/2008 | Hildreth | |
| 2005/0031325 A1* | 2/2005 | Fujii | 396/54 |
| 2005/0280733 A1 | 12/2005 | Imaizumi | |
| 2006/0204043 A1 | 9/2006 | Takei | |
| 2006/0239672 A1* | 10/2006 | Yost et al. | 396/125 |
| 2007/0077046 A1 | 4/2007 | Lim | |
| 2009/0147991 A1* | 6/2009 | Chau | 382/103 |
| 2009/0175533 A1* | 7/2009 | Sabe et al. | 382/159 |
| 2009/0185068 A1* | 7/2009 | Iwasaki | 348/345 |
| 2010/0045800 A1* | 2/2010 | Chebil et al. | 348/169 |
| 2010/0091169 A1* | 4/2010 | Border et al. | 348/345 |

FOREIGN PATENT DOCUMENTS

JP    62-269919 A    11/1987

* cited by examiner

*Primary Examiner* — Tuan Ho
(74) *Attorney, Agent, or Firm* — Ridout & Maybee LLP

(57) ABSTRACT

A method and apparatus providing an autofocus routine in a camera apparatus having a processor is disclosed. The camera apparatus is adapted to detect a number of images and communicate image signals representative thereof to the processor. The method includes determining that a degree of change between a first image signal and a second image signal is below a predetermined threshold and responsive thereto, performing the autofocus routine.

27 Claims, 3 Drawing Sheets

METHOD AND APPARATUS FOR REDUCING CONTINUOUS AUTOFOCUS POWER CONSUMPTION

BACKGROUND

1. Field

The disclosed and claimed concept relates generally to electronic devices and, more particularly, to a method for controlling an autofocus mechanism related to a camera module incorporated into a portable electronic device in order to reduce continuous autofocus power consumption.

2. Background

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Some handheld electronic devices and other electronic devices employ small cameras that can take photographs that are then stored on the electronic device. Such cameras typically are digital cameras that comprise a camera lens, a sensor, and a processor system, which may be manufactured and sold as a modular unit. In contrast to an analog camera that records an image chemically or physically on film or another medium, a digital camera processes images electronically. Typically, the sensor receives light through the camera lens and generates an image signal as a function of the image received by the sensor. The sensor provides the image signal to an embedded program stored and executed on the processor system in order to process the image in various ways.

Such cameras typically include an autofocus function that automatically adjusts the camera lens to ensure that the subject of a picture is properly focused. Such autofocus function generally causes a rather significant delay between when a camera button is "clicked" by a user desiring to capture an image and when the image is actually captured by the device. Such delay is caused by the time required for auto-focusing (generally 1 second for a full scan) of the image. Frequently such delay is undesirable to a user and may cause a particular image to be wholly or partially missed.

One potential approach for reducing such delay is to allow the auto-focus system to continually run an autofocus routine, whereby the lens may be moved substantially continuously to the current "best" focus position. Such an approach may draw a significant amount of power, however, and such power draw is generally undesirable in such a handheld electronic device where battery size is generally sought to be reduced and battery life increased.

BRIEF DESCRIPTION OF THE DRAWINGS

A full understanding of the disclosed and claimed concept can be gained from the following Description when read in conjunction with the accompanying drawings in which:

DESCRIPTION

The accompanying figures and the description that follows set forth the disclosed and claimed concept in its preferred embodiments. It is, however, contemplated that persons generally familiar with handheld electronic devices will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

For purposes of the description hereinafter, the terms "upper", "lower", "right", "left", "vertical", "horizontal", "top", "bottom", and derivatives thereof shall relate to the disclosed and claimed concept as it is oriented in the figures.

Figure 1:
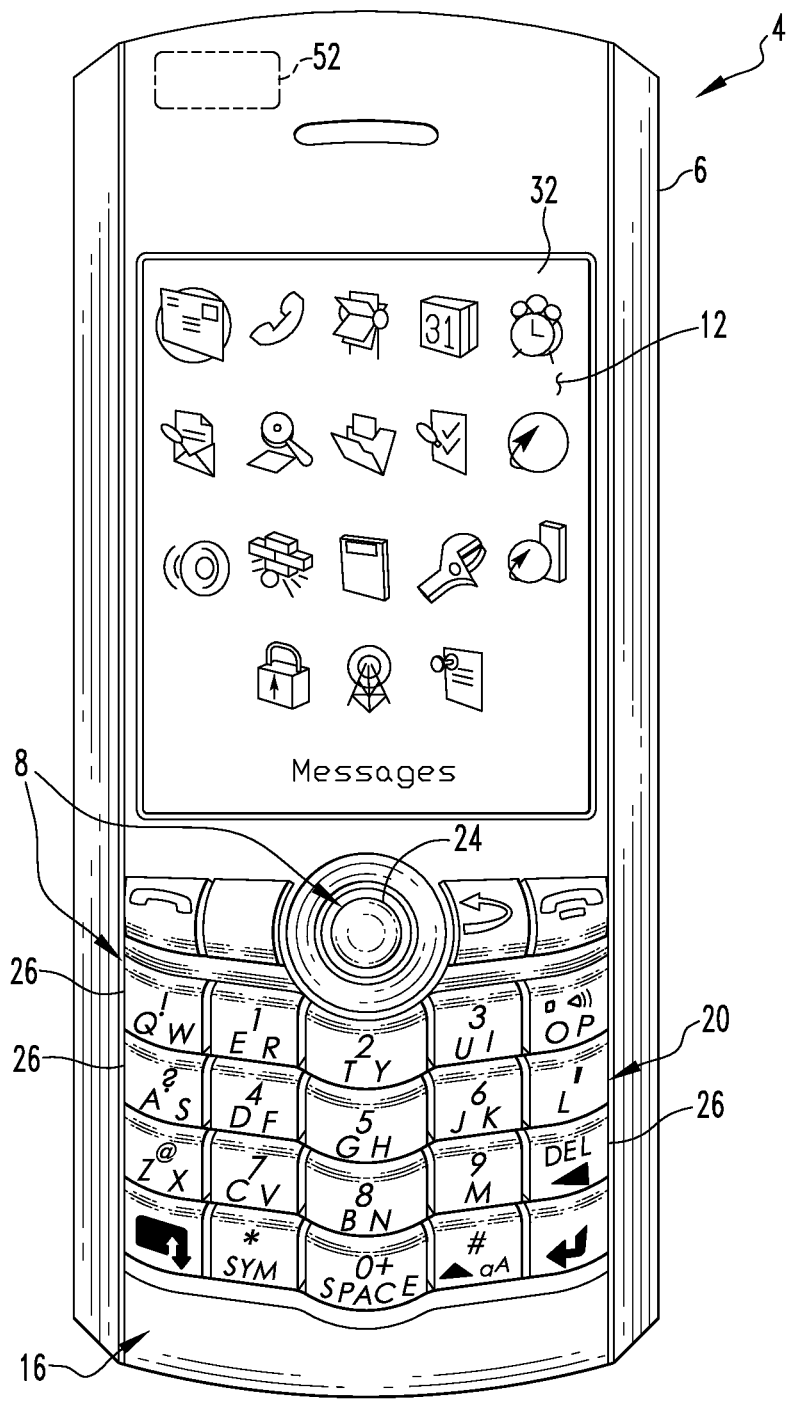
FIG. 1 is a front plan view of an illustrative handheld electronic device in accordance with the disclosed and claimed concept upon which is performed a method in accordance with the disclosed and claimed concept.
Figure 2:
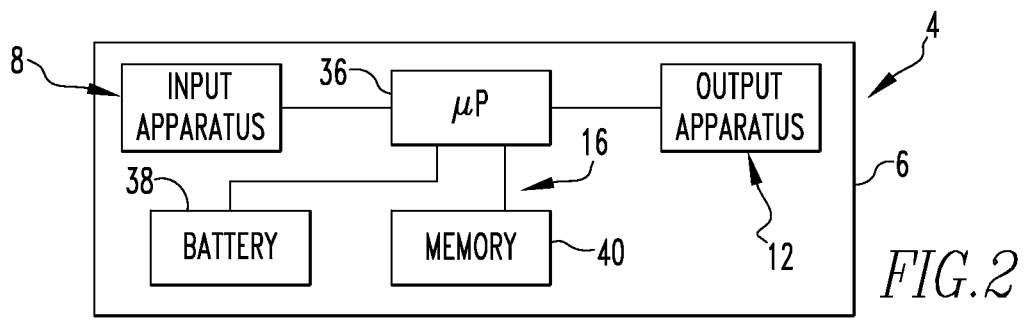
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The electronic device 4 may be a handheld or other portable electronic device (e.g. and without limitation, a digital camera, a PDA, a cell phone, a digital watch, or a laptop computer). The electronic device 4 comprises a housing 6, and further comprises an input apparatus 8, an output apparatus 12, and a processor apparatus 16 disposed in the housing 6. The input apparatus 8 provides input to the processor apparatus 16. The processor apparatus 16 provides output signals to the output apparatus 12.

In the illustrative embodiment shown, input apparatus 8 comprises a keypad 20 and a trackball 24. The keypad 20 in the illustrative embodiment depicted herein comprises a plurality of keys 26 that are each actuatable to provide input to the processor apparatus 16. The trackball 24 is rotatable to provide navigational and other input to the processor apparatus 16, and additionally is translatable in a direction inwardly toward the electronic device 4 to provide other inputs, such as selection inputs. The trackball 24 is freely rotatable on the housing 6 and thus is able to provide navigational inputs in the vertical direction, i.e., the up-down direction, in the horizontal direction, i.e., the left-right (side to side) direction, as well as combinations thereof. In addition, the trackball 24 may be adapted to provide navigational inputs in diagonal directions. The keys 26 and the trackball 24 serve as input members which are actuatable to provide input to the processor apparatus 16. Alternative mechanisms for providing similar multi-directional navigation may be used in place of the trackball 24, such as, without limitation, a joystick, a touchpad, a touch-sensitive display, and hard buttons (including a button devoted to camera-related functions) disposed on the housing 6 of the electronic device 4. The illustrative output apparatus 12 comprises a display 32.

The processor 16 controls overall operation of the electronic device 4. For example, the processor 16 processes and controls voice communication as well as data communications.

As can be seen in FIG. 2, the processor apparatus 16 comprises a processor 36 and a memory 40. The processor 36 may be of any of a wide variety of processing devices, including and without limitation, microcontrollers, microprocessors (μP), sequencers, digital signal processors or state machines implemented in hardware logic that interfaces with the memory 40. Processor 36 is responsive to inputs from the input apparatus 8 and provides output signals to the output apparatus 12.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines which are executable on the processor 36 for operating the electronic device 4. As employed herein, the expression "a number of" and variations thereof shall refer broadly to any nonzero quantity, including a quantity of one.

Figure 3:
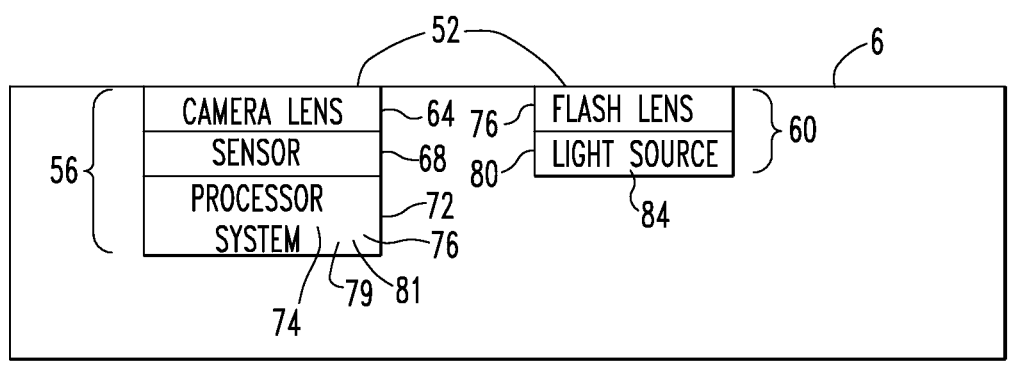
FIG. 3 is a schematic depiction of a camera apparatus in accordance with the disclosed and claimed concept that can be incorporated into the handheld electronic device of FIG. 1.

Referring to FIGS. 1 and 3, the electronic device 4 further includes as an input apparatus 8 a camera apparatus 52 disposed on or in the housing 6. The camera apparatus 52 is considered to comprise a camera 56 and a flash 60, although the camera 56 and the flash 60 can be separate components, and in some embodiments the flash 60 is optional. The camera 56 may be a modular device that comprises a camera lens assembly 64, a sensor 68, and a processor system 72. As employed herein, the expression "modular" shall refer broadly to a self-contained device that is, for instance, purchased and/or installed and/or operable in some fashion as a self-contained unit. As a general matter, the lens assembly 64 overlies the sensor 68 which is mounted to a printed circuit board upon which is disposed the processor system 72. However, other modular configurations can be employed without departing from the present concept.

The lens assembly 64 is used to focus an image of a scene that is detected by the sensor 68, which generates an image signal as a function of the detected image. The sensor 68 then communicates the image signal, which is representative of the image, to processor system 72 for further handling (e.g., without limitation, storing the image if desired by the user taking a photograph, using the image a part of to perform other functions as further described below). As used herein, the term "scene" shall be used to refer to the entire image that would be captured by the camera apparatus 52 at a given time. In an illustrative embodiment, the sensor 68 captures a number of successive images or "frames" of the scene and communicates a signal representative of each successive frame to the processor system 72.

Similar to the processor apparatus 16 previously discussed, processor system 72 may comprise a processor 74 and a memory 76. Processor 74 may be any of a wide variety of processing devices, including and without limitation, microcontrollers, microprocessors (μP), sequencers, digital signal processors or state machines implemented in hardware logic that interfaces with the memory 76. The memory 76 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 76 has stored therein a number of routines 79 that are executable on the processor 74 for operating the camera apparatus 52 including, for example without limitation, a routine for carrying out the method described below as well as an autofocus routine 81. Generally speaking, an "autofocus routine" is a process carried out automatically (i.e., without user action) by the camera apparatus 52, in which the lens of the lens assembly 64 is positioned (e.g., physically moved inward or outward or maintained in position) to obtain or maintain focus of a detected image or one or more objects in the image. An autofocus routine may be embodied as a set of instructions executable by processor 74. Autofocus routine 81 may be based on any of a variety of widely known autofocus algorithms that adjust the camera lens in a manner that brings the detected image into a "best" focus. Generally, the "best" focus is attained when a particular portion of the scene, or region of interest (ROI), is as sharp as possible. The ROI is not necessarily the center of the scene, instead the ROI may be determined by another routine that analyzes one or more image signals that have been generated as a function of one or more detected images (for example, without limitation, a face detection algorithm might be running, which has a basic objective of focusing on faces that are in the middle 30% of the image). Regions of interest in images and image signals may be established not only by instructions in a routine, but by other factors, such as user preferences, user commands, or a current state of the camera apparatus 52.

The flash 60 comprises a flash lens 76 and a light source 80 that similarly can be of a modular nature. The flash lens 76 typically is a Fresnel lens that tends to direct light rays in a particular general direction. The illustrative light source 80 comprises a plurality of LEDs 84.

Camera apparatus 52 may be any of a variety of commercially available camera modules fabricated by a variety of manufacturers for the purpose of being incorporated into other devices, such as the handheld electronic device 4. Sensor 68 may be one of a variety of available charge coupled devices (CCD), complimentary metal oxide semiconductor (CMOS) imaging devices, or another suitable form of device capable of receiving a light signal of an object to be photographed and converting the light signal input through lens assembly 64 into an electrical image signal, which is then transmitted to processor system 72.

When handheld electronic device 4 is used to take a picture, the processor 16 of the electronic device 4 typically sends a signal to processor system 72 of the camera apparatus 52 responsive to an indication by a user of the device 4 that a picture is to be taken. Processor 74 of processor system 72 then generally accesses memory 76 to retrieve and execute a sequence of instructions from one or more routines stored therein, thereby causing processor 74 to operate camera apparatus 52 to scan one or more images in preparation for taking a picture as will shortly be explained.

In FIGS. 1, 2 and 3, electronic components may be powered by a power supply, such as a battery 38. Although the disclosure herein may be advantageous in management of power supplied by a battery, the concepts described herein may be applied to devices powered in any number of ways, such as by solar power or fuel cell.

Figure 4:
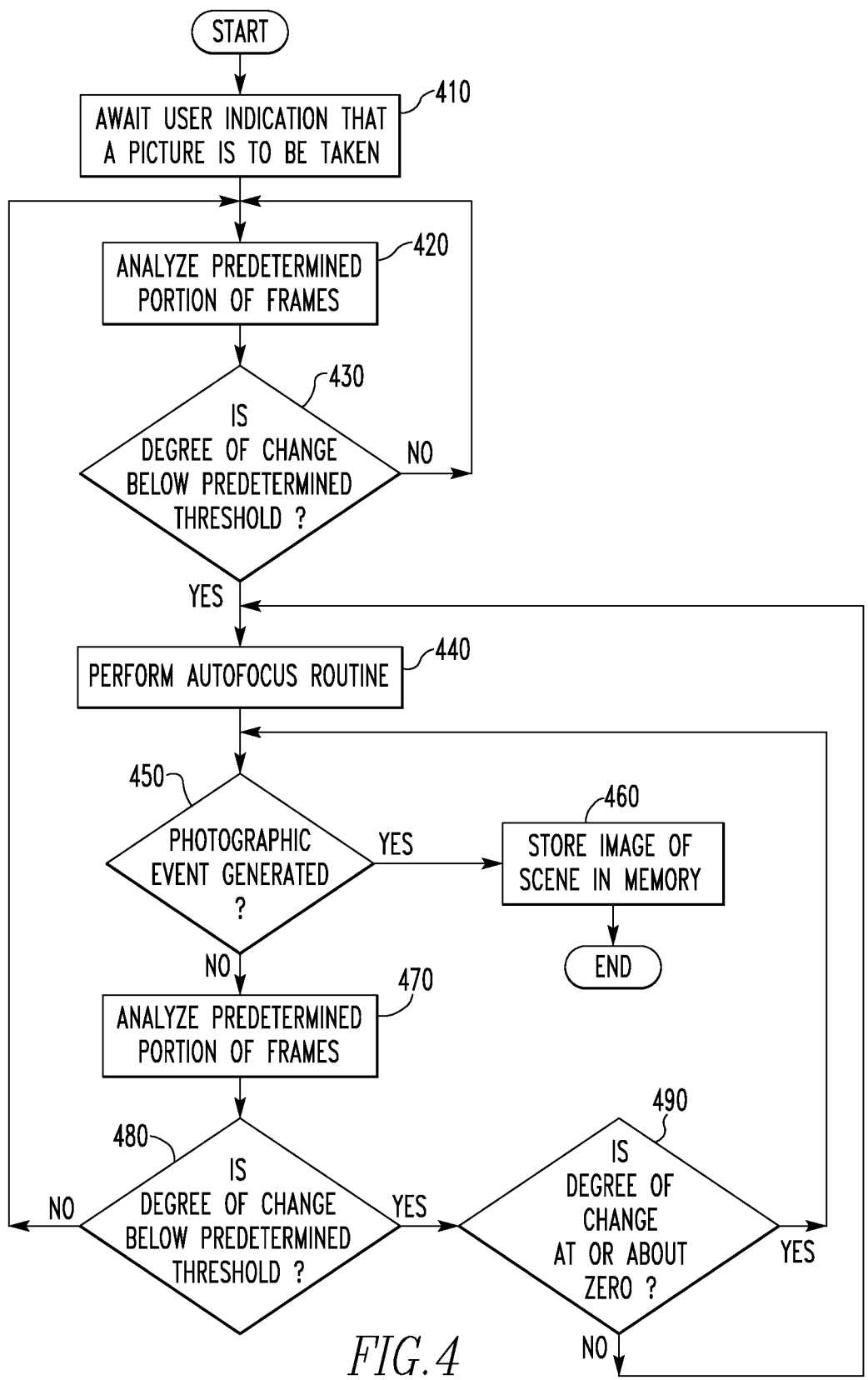
FIG. 4 is a flowchart depicting an embodiment of an improved method in accordance with the disclosed and claimed concept.

FIG. 4 is a flow chart of an embodiment of a method that can be carried out by an electronic device with a camera apparatus 52 having an autofocus capability being used to take a picture of a scene in accordance with a concept disclosed herein.

Starting at 410, the electronic device 4 awaits an indication from a user of the electronic device 4 that a picture is desired to be taken. Such indication may be supplied, for example without limitation, by the user actuating an input device 8 disposed on the housing 6 of the electronic device 4 selecting a camera function or another mechanism under the user's control. Upon receiving such indication, sensor 68 of camera apparatus 52 begins to detect (scan) a series of frames of the scene and communicates a signal indicative of each frame to processor system 72.

At 420, processor system 72 analyzes all, or a region of interest of (previously discussed), at least two of the series of frames (communicated as two image signals). Through such analysis, the processor system 72 can determine whether or not to perform autofocus routine 81 as described in step 440. Although the two frames need not be consecutive, it may be advantageous to analyze the two consecutive frames most recently scanned by sensor 68, as they may be most relevant to the most current state of camera apparatus 52. If, as a result of such analysis, it is determined at 430 that a degree of change between the two frames is less than a predetermined threshold, the method proceeds to step 440 where processor system 72 runs the autofocus routine 81 thus bringing the scene into focus.

As used herein, the terms "degree of change" shall refer to a measure of the difference between selected corresponding portions of two images or differences between the representations thereof. The difference can be determined or measured in any number of ways (e.g., without limitation, by computing a mathematical correlation between the image signals or by computing one or more "sharpness scores," as discussed below). The degree of change may be determined with respect to regions of interest in the frames. It is possible that the regions of interest may be the respective frame images (or image signals) as a whole, but in a typical implementation, the region of interest is less than the entire frame image (or image signal). A region of interest in the image signal from one frame may be analyzed in comparison to a corresponding region of interest in another image signal from another frame. This analysis of corresponding regions of interest can be used to determine the degree of change. In some embodiments, the portions of the images outside the corresponding regions of interest would be irrelevant to the determination of the degree of change, and in such embodiments, portions of the images outside the corresponding regions of interest need not be analyzed at all.

As used herein, the terms "predetermined threshold" shall refer to a value, that when exceeded, results in the autofocus routine 81 not being executed. A degree of change may exceed a threshold by passing the threshold from low to high or from high to low. For purposes of simplicity of description, it will be assumed that when a degree of change is below the threshold, further autofocusing is desirable. Accordingly, as used herein, "below a predetermined threshold" means that there is relatively little degree of change between the two images or portions thereof. The predetermined threshold is "predetermined" in the sense that the threshold is established prior to the analysis in 420. Such threshold may be determined in whole or part by a number of factors or combination of factors. For example and without limitation, the threshold may be a function of input from a user, remaining battery level, or specification by one or more routines 79. When the power level remaining in the battery 38 is low, for example, the threshold may be adjusted such that autofocusing is less likely to occur and therefore less likely to consume battery power.

It would generally be unnecessary to perform autofocus operations when camera apparatus 52 is being moved beyond a small extent, as the likelihood of a picture being taken is very low compared to when camera apparatus 52 is stationary. By determining the amount of change from one image to another, processor 72 can generally determine if the entire camera apparatus 52 is moving (high degree of change), if camera apparatus 52 is stationary and an object or objects within the scene are moving (medium degree of change), or if the camera apparatus 52 as well as the entire scene is stationary (at or about zero degree of change). In the second two instances, it would generally be desirable to perform autofocus operations as the likelihood of a picture being taken is high (the user having so indicated in 410).

For example, without limitation, in an example embodiment of the disclosed concept, a known autofocus routine that relies on a "sharpness score" based on many points across an image may be employed. In such example, the "sharpness score" could be used as the "degree of change" and may be based on one or more metrics such as 1) the estimated global motion of the scene and 2) the estimated change in focus of the subject (ROI). A large change of the sharpness score across an entire scene would correspond to a high degree of change. A change of the sharpness score of the ROI would generally correspond to a low to medium degree of change. A slight change of the sharpness score across the whole image (global motion) and the ROI would generally correspond to medium to high degree of change. Little to no change in the sharpness score would generally correspond to a degree of change at or about zero.

Proceeding with the method described in FIG. 4, if, as a result of the analysis in 420, if it is determined at 430 that the degree of change is not less than the predetermined threshold (thus indicating camera apparatus 52 is moving more than the predetermined threshold amount), the method does not proceed to run the autofocus routine 81 as described in step 440 but instead repeats steps 420 and 430 until a determination is made that the degree of change between two frames is less than the predetermined threshold. Although not depicted in FIG. 4, the user may generate a photographic event (i.e., the user need not be prohibited from taking a picture) in the absence of an autofocus.

When the processor system 72 performs the autofocus routine 81, autofocusing is accomplished according to the autofocus routine. In a typical embodiment, the autofocus routine's set of instructions may be executed by processor system 72, which may involve moving one or more physical components of camera apparatus 52 with respect to one another or with respect to the housing 6 to bring the scene into focus. The physical movement of components associated with autofocusing may require substantially increased power consumption. Once the scene has been brought into focus at 440, the method proceeds to 450 where a determination is made whether or not a photographic event is generated by the user. Such event may be generated by the user actuating an input device 8 disposed on the housing 6 of the electronic device 4, setting a timer, or by another mechanism under the user's control.

If at 450 a photographic event is generated, the method concludes at 460 with an image of the scene being captured (using the autofocus obtained in step 440) and stored in a memory, such as memory 76 of camera apparatus 52, memory 40 of the electronic device 4, or another memory (not shown) contained on or accessible by electronic device 4. Typically, storing an image in memory includes storing all or part of the image signal generated as a function of that image. In the alternative, the method may continue by returning to step 420, and may conclude when the user supplies an indication that no more pictures will be taken (e.g., without limitation, by exiting or turning off the camera functions on electronic device 4).

If no photographic event is generated at 450, the method proceeds to 470 where processor system 72, like step 420, analyzes all, or portions of the images, of at least two of the series of frames (communicated as two image signals).

The analysis in step 470 may be, but need not be, the same kind of analysis as was performed in step 420. If, as a result of the analysis in 470, it is determined at 480 that the degree of change is not less than the predetermined threshold (thus indicating camera apparatus 52 is moving more than the predetermined threshold amount), the method returns to step 420. The threshold in step 480 may be the same as, but is not necessarily the same as, the threshold in step 430. However, if it is determined at 480 that the degree of change is less than the threshold (thus indicating that the camera apparatus 52 is moving less than the threshold amount), the method proceeds to step 490 where it is further determined if the degree of change is at or about zero (thus indicating that neither the camera apparatus 52 or any noticeable part of the scene has moved or changed focus). The concept is not limited to any particular tolerance with respect to whether the change is sufficiently close to zero.

If at 490 it is determined that the degree of change is at or about zero, the method returns to step 450 awaiting generation of a photographic event as the focus previously achieved in step 440 should still be adequate since no noticeable movement of the camera apparatus 52 or any part of the scene has occurred since the autofocus was last performed. Alternatively, if at 490 it is determined that the degree of change is not at or about zero (thus indicating that a portion of the scene has moved), the method returns to step 440 where the autofocus routine 81 is once again performed (i.e., the autofocus routine 81 is reperformed).

As described above, according to the disclosed concept, movement of the handheld electronic device 4 is determined and measured through analysis of images captured by camera apparatus 72 and analyzed by processor system 72. By determining whether the handheld electronic device 4 is moving or stationary relative to all or part of the scene, the disclosed concept provides for an intelligent autofocusing capability that operates the autofocus function only when needed, thereby conserving power. As such autofocusing occurs before a photographic event is generated, the photographing time is reduced (the time from when a user indicates a desire to take a picture to when the image is captured) thus providing a greater likelihood that a user will capture a desired image. Furthermore, such benefits may be provided without requiring any additional apparatus beyond those already commonly present in a known handheld electronic device.

The concept described herein may realize one or more additional advantages. The concept flexibly can be adapted to a number of autofocus routines. Further, the concept could apply multiple autofocus routines. The flexibility may also extend to operation with routines that establish regions of interest in different ways. In addition, the concept can be applied in any number of electronic devices having cameras, including devices that are dedicated cameras and that have little or no wireless communication capability. The concept may also be advantageously applicable to devices having different kinds or configurations of camera apparatus 52 or other hardware. Some embodiments of the concept may be further advantageous in that they make efficient use of the autofocus routine between individual photograph-generating events.

Illustrative embodiments of the present concept can also comprise computer readable codes on a computer readable storage medium. The computer readable storage medium can comprise any data storage device that can store data or instructions that can be read or executed by a computer system or a component thereof, such as a processor. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing illustrative embodiments of the present invention can be construed by programmers of ordinary skill in the art to which the present disclosure pertains.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of providing an autofocus routine for a camera comprising:

determining that a degree of change between a first image signal being a function of a first frame and a second image signal being a function of a second frame detected at the camera is below a predetermined threshold, the determining including analyzing corresponding regions of interest in the first image signal and the second image signal to determine differences between corresponding regions of interest; and responsive to said determining, performing the autofocus routine at the camera.

2. The method of claim 1 wherein analyzing corresponding regions of interest comprises analyzing the entire image signals.

3. The method of claim 2 wherein analyzing corresponding regions of interest comprises analyzing less than the entire image signals.

4. The method of claim 1 wherein determining that a degree of change between a first image signal and a second image signal is below a predetermined threshold further comprises determining the predetermined threshold based at least in part on power level remaining in a battery of the camera apparatus.

5. The method of claim 1 further comprising after performing the autofocus routine, detecting a photographic event, and responsive thereto, storing one of the number of images in a memory at the camera.

6. The method of claim 1 further comprising after performing the autofocus routine, determining that a degree of change between another first image signal and another second image signal is below a predetermined threshold; and responsive to said determining, reperforming the autofocus routine.

7. An electronic device comprising:

a camera apparatus including a processor and a memory, the camera apparatus being adapted to detect a number of images and communicate image signals representative of the images to the processor, the processor being adapted to:

determine that a degree of change between a first image signal being a function of a first frame and a second image signal being a function of a second frame is below a predetermined threshold and responsive thereto, perform the autofocus routine, determination including analysis of corresponding regions of interest in the first image signal to determine differences between the corresponding regions of interest.

8. The electronic device of claim 7 wherein analyzing corresponding regions of interest comprises analyzing the entire image signals.

9. The electronic device of claim method of claim 7 wherein analyzing corresponding regions of interest comprise analyzing less than the entire image signals.

10. The electronic device of claim 7 wherein the processor is adapted to determine the predetermined threshold based at least in-part on power level remaining in a battery of the camera apparatus.

11. The electronic device of claim 7 wherein the processor is further adapted to:
after performing the autofocus routine, detect a photographic event, and responsive thereto, store one of the number of images in a memory associated with the processor.

12. The electronic device of claim 7 wherein the processor is further adapted to:
after performing the autofocus routine, determine that a degree of change between another first image signal and another second image signal is below a second predetermined threshold and responsive thereto, reperform the autofocus routine.

13. A nontransitory machine readable storage medium that provides instructions which, when executed on an electronic device of a type including a camera apparatus having a processor and being adapted to detect a number of images and communicate signals representative thereof to the processor, cause the processor to perform operations comprising:
determining that a degree of change between a first image signal being a function of a first frame and a second image signal being a function of a second frame is below a predetermined threshold, the determining including analyzing corresponding regions of interest in the first image signal and the second image signal to determine differences between the corresponding regions of interest; and
responsive to said determining, performing the autofocus routine.

14. The electronic device of claim 12 further comprising the processor being adapted to determine the second threshold based at least in part on an updated power level remaining in the battery.

15. A method of providing an autofocus routine for a camera comprising:
determining that a degree of change between a first image signal and a second image signal detected at the camera is below a predetermined threshold, the predetermined threshold based at least in part upon power level remaining in a battery of the camera; and
responsive to said determining, performing the autofocus routine at the camera.

16. The method of claim 15 wherein determining that a degree of change between a first image signal and a second image signal is below the predetermined threshold comprises:
generating the first image signal and the second image signal, the first image signal being a function of a first frame and the second image signal being a function of a second frame; and
analyzing corresponding regions of interest in the first image signal and the second image signal in order to determine differences between the corresponding regions of interest.

17. The method of claim 16 wherein analyzing corresponding regions of interest comprises analyzing the entire image signals.

18. The method of claim 17 wherein analyzing corresponding regions of interest comprises analyzing less than the entire image signals.

19. The method of claim 15 further comprising after performing the autofocus routine, detecting a photographic event, and responsive thereto, storing one of the number of images in a memory at the camera.

20. The method of claim 15 further comprising after performing the autofocus routine, determining that a degree of change between another first image signal and another second image signal is below a predetermined threshold; and
responsive to said determining, reperforming the autofocus routine.

21. An electronic device comprising:
a camera apparatus including a processor and a memory, the camera apparatus being adapted to detect a number of images and communicate image signals representative of the images to the processor, the processor being adapted to:
determine that a degree of change between a first image signal and a second image signal is below a predetermined threshold, the predetermined threshold based at least in part on power level remaining in a battery of the camera apparatus and responsive thereto, perform the autofocus routine.

22. The electronic device of claim 21 wherein when determining that a degree of change between a first image signal and a second image signal is below the predetermined threshold, the processor is adapted to:
detect the first image signal and the second image signal; and
analyze corresponding regions of interest of the first image signal and the second image signal in order to determine differences between the corresponding regions of interest.

23. The electronic device of claim 21 wherein analyzing corresponding regions of interest comprises analyzing the entire image signals.

24. The electronic device of claim method of claim 21 wherein analyzing corresponding regions of interest comprise analyzing less than the entire image signals.

25. The electronic device of claim 21 wherein the processor is further adapted to:
after performing the autofocus routine, detect a photographic event, and responsive thereto, store one of the number of images in a memory associated with the processor.

26. The electronic device of claim 21 wherein the processor is further adapted to:
after performing the autofocus routine, determine that a degree of change between another first image signal and another second image signal is below a second predetermined threshold and responsive thereto, reperform the autofocus routine.

27. A nontransitory machine readable storage medium that provides instructions which, when executed on an electronic device of a type including a camera apparatus having a processor and being adapted to detect a number of images and communicate signals representative thereof to the processor, cause the processor to perform operations comprising:
determining that a degree of change between a first image signal and a second image signal is below a predetermined threshold, the predetermined threshold based at least in part on power level remaining in a battery of the camera apparatus; and
responsive to said determining, performing the autofocus routine.

* * * * *